United States Patent
Hwang et al.

(10) Patent No.: US 9,445,071 B2
(45) Date of Patent: Sep. 13, 2016

(54) METHOD AND APPARATUS GENERATING MULTI-VIEW IMAGES FOR THREE-DIMENSIONAL DISPLAY

(75) Inventors: Kyu Young Hwang, Hwaseong-si (KR); Ho Young Lee, Suwon-si (KR); Yang Ho Cho, Hwaseong-si (KR); Young Ju Jeong, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 177 days.

(21) Appl. No.: 13/326,757

(22) Filed: Dec. 15, 2011

(65) Prior Publication Data
US 2012/0169722 A1 Jul. 5, 2012

(30) Foreign Application Priority Data
Jan. 3, 2011 (KR) .......... 10-2011-0000228

(51) Int. Cl.
*H04N 13/00* (2006.01)

(52) U.S. Cl.
CPC ..... *H04N 13/0011* (2013.01); *H04N 2213/005* (2013.01)

(58) Field of Classification Search
USPC ........................................... 345/419
See application file for complete search history.

(56) References Cited

U.S. PATENT DOCUMENTS

| 7,015,926 | B2 * | 3/2006 | Zitnick et al. ............... 345/592 |
| 8,379,972 | B1 * | 2/2013 | Wang et al. ................. 382/162 |
| 2010/0026712 | A1 * | 2/2010 | Aliprandi et al. ........... 345/629 |
| 2012/0162193 | A1 * | 6/2012 | Bae et al. .................... 345/419 |

FOREIGN PATENT DOCUMENTS

| JP | 9-27969 A | 1/1997 |
| JP | 2000-30040 A | 1/2000 |
| JP | 2006-12161 A | 1/2006 |
| JP | 2006-24206 A | 1/2006 |
| JP | 2007-95073 A | 4/2007 |
| KR | 10-0926520 | 11/2009 |
| KR | 10-0953076 | 4/2010 |
| KR | 10-0960694 | 5/2010 |
| WO | WO 2010/037512 A1 | 4/2010 |

OTHER PUBLICATIONS

Japanese Office Action issued on Mar. 31, 2015 in counterpart Japanese Application No. 2011-279644 (8 pages with English translation).

* cited by examiner

*Primary Examiner* — Barry Drennan
*Assistant Examiner* — Richard M Russell
(74) *Attorney, Agent, or Firm* — NSIP Law

(57) ABSTRACT

A method and apparatus for generating multi-view images are provided. An error suspicious area may be detected from a reference view image. A foreground-first image may be generated by foreground-first warping including regarding the error suspicious area as a foreground, and a background-first image may be generated by background-first warping including regarding the error suspicious area as a background. The foreground-first image and the background-first image may be blended, and an output view image in a predetermined viewpoint may be generated.

31 Claims, 10 Drawing Sheets

FIG. 7
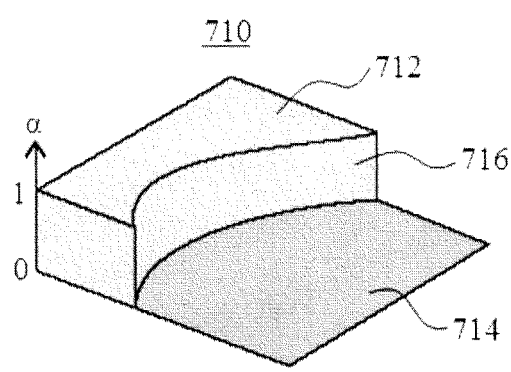
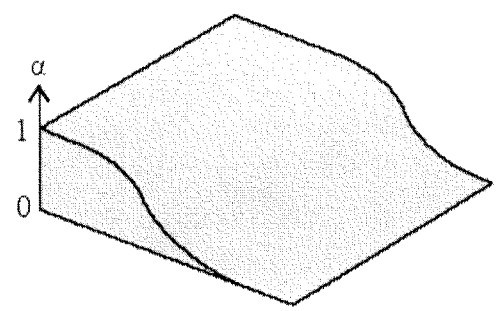

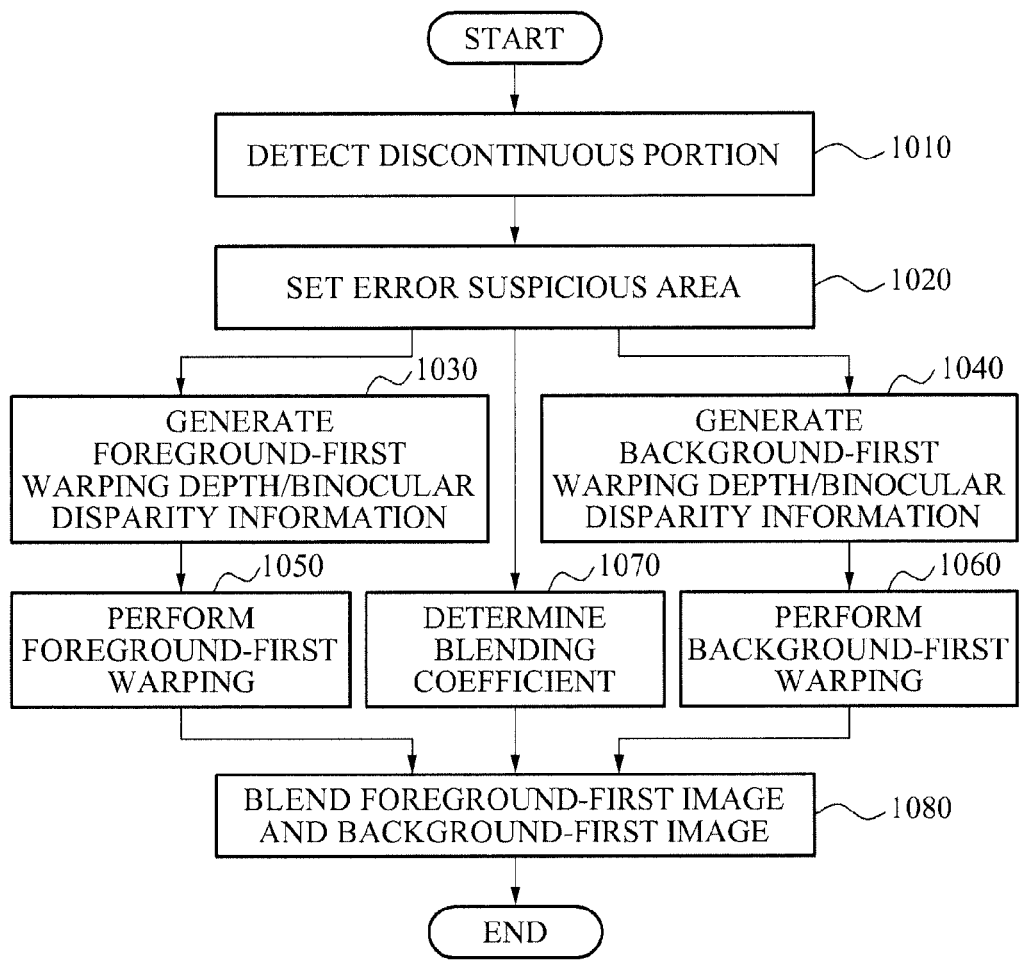

METHOD AND APPARATUS GENERATING MULTI-VIEW IMAGES FOR THREE-DIMENSIONAL DISPLAY

CROSS-REFERENCE TO RELATED APPLICATIONS

This application claims the benefit of Korean Patent Application No. 10-2011-0000228, filed on Jan. 3, 2011, in the Korean Intellectual Property Office, the disclosure of which is incorporated herein by reference.

BACKGROUND

1. Field

One or more embodiments of the following description relate to a method and apparatus generating and rendering multiple images based on input reference multi-view images, for multi-view three-dimensional (3D) display.

2. Description of the Related Art

A three-dimensional (3D) display apparatus may output a stereoscopic image, which may increase the felt or sensed reality and immersion of a viewer in the 3D environment.

Such a 3D display apparatus may employ a stereo scheme, where separate right and left images are displayed to a viewer at a single viewpoint to be individually viewed by respective left or right eyes, e.g., through filtering glasses, and a multi-view scheme, wherein multiple images are displayed for different viewpoints. The viewpoint is a point of view that an image is seen from, e.g., as if a viewer were viewing the image from that point. In the multi-view scheme, each displayed image may have been generated by separate cameras capturing image data of the object, or generated by a single camera that is repeatedly moved to have different orientations toward an object, such that each display image provides a different view of the object from different perspectives, i.e., from different viewpoints. However, the multi-view scheme requires a large amount of input data because of the multiple images needed to be input and displayed.

SUMMARY

According to one or more embodiments, there may be provided an apparatus and method for generating and rendering multiple images based on input images for multi-view three-dimensional (3D) display. Therefore, the conventional need of large amounts of input image data can be reduced by generating multiple images from different viewpoints, based on a relatively small number of reference views, e.g., corresponding to the respective input image data. Additionally, in an embodiment, if the amount of input image data is not reduced, additional images may be generated and displayed in addition to the input image data.

According to one or more embodiments, there may be also provided an apparatus and method that may prevent an image quality from being lowered in an object boundary when multi-view rendering is performed.

The foregoing and/or other aspects are achieved by providing an image processing apparatus to generate an output view image for a predetermined viewpoint based on a reference view image corresponding to a first reference view for a reference viewpoint, and based on depth/binocular disparity information of the reference view image, the image processing apparatus including a foreground-first warping unit to generate a foreground-first image by performing a foreground-first warping of the reference view image that regards a portion of the reference view image corresponding to a detected error suspicious area as being included in a foreground of the reference view image, with the detected error suspicious area being one or more areas of the reference view image having a determined increased probability of depth disparity error based on the depth/binocular disparity information of the reference view image, a background-first warping unit to generate a background-first image by performing a background-first warping of a background of the reference view image that excludes the portion of the reference view image corresponding to the error suspicious area, and a blending unit to blend the foreground-first image and the background-first image to generate the output view image.

The foregoing and/or other aspects are achieved by providing an image processing method of generating an output view image for a predetermined viewpoint based on a reference view image corresponding to a first reference view for a reference viewpoint, and based on depth/binocular disparity information of the reference view image, the image processing method including performing a foreground-first warping of the reference view image, that regards a portion of the reference view image corresponding to a detected error suspicious area as being included in a foreground of the reference view image, to generate a foreground-first image, with the detected error suspicious area being one or more areas of the reference view image having a determined increased probability of depth disparity error based on the depth/binocular disparity information of the reference view image, performing a background-first warping of a background of the reference view image, that excludes the portion of the reference view image corresponding to the error suspicious area, to generate a background-first image, and blending the foreground-first image and the background-first image, and generating the output view image.

The foregoing and/or other aspects are achieved by providing an image processing apparatus to generate a first intermediate center view image for a center viewpoint based on a first reference view image, illustrating at least one object, from a first reference viewpoint, and based on depth/binocular disparity information of the first reference view image, the image processing apparatus including a first warping unit to warp the first reference view image, by respectively warping at least one determined foreground of the first reference view image and at least one determined background of the first reference view image to generate the first intermediate center view image for the center viewpoint, different from the first reference viewpoint, wherein the warping of the at least one foreground and the at least one background of the first reference view image are differently performed based upon a detected error suspicious area of the first reference view image, the detected error suspicious area being one or more areas of the first reference view image having a determined increased probability of depth disparity error based on the depth/binocular disparity information of the first reference view image, and an output unit to output the first intermediate center view image as an additional view image that includes the at least one object, from the center viewpoint.

The foregoing and/or other aspects are achieved by providing an image processing method generating a first intermediate center view image for a center viewpoint based on a first reference view image, illustrating at least one object, from a first reference viewpoint, and based on depth/binocular disparity information of the first reference view image, the image processing method including respectively warping at least one determined foreground of the first reference view image and at least one determined background of the first reference view image to generate the first intermediate center view image for the center viewpoint, different from the first reference viewpoint, wherein the warping of the at least one foreground and the at least one background of the first reference view image are differently performed based upon a detected error suspicious area of the first reference view image, the detected error suspicious area being one or more areas of the first reference view image having a determined increased probability of depth disparity error based on the depth/binocular disparity information of the first reference view image, and outputting the first intermediate center view image as an additional view image that includes the at least one object, from the center viewpoint.

Additional aspects, features, and/or advantages of one or more embodiments will be set forth in part in the description which follows and, in part, will be apparent from the description, or may be learned by practice of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and/or other aspects and advantages will become apparent and more readily appreciated from the following description of one or more embodiments, taken in conjunction with the accompanying drawings of which:

FIG. 7 illustrates a diagram of an example of blending a foreground-first image and a background-first image, according to one or more embodiments;

FIG. 10 illustrates a flowchart of an image processing method, according to one or more embodiments.

DETAILED DESCRIPTION

Figure 1:
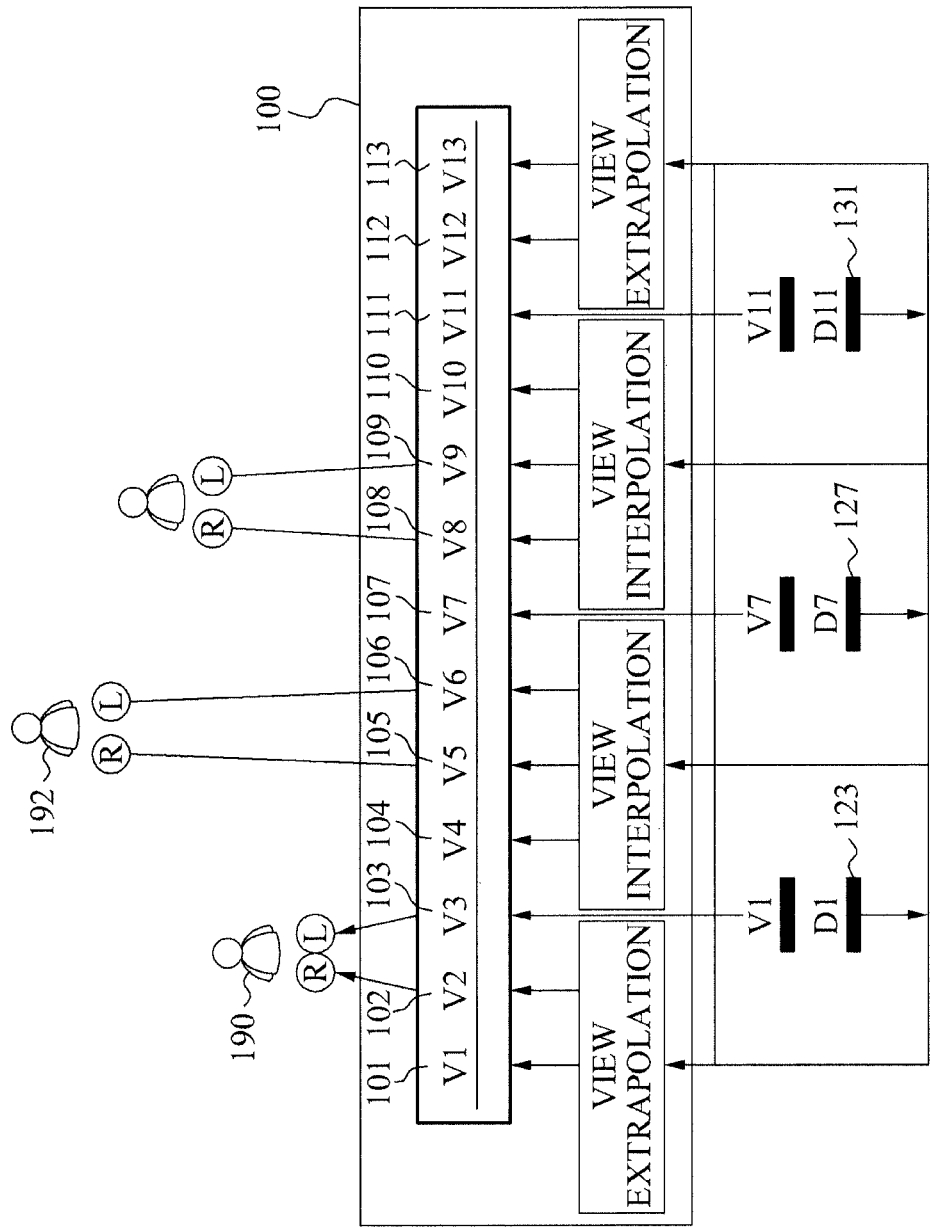
FIG. 1 illustrates a diagram of an image processing apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

FIG. 1 illustrates a diagram of an image processing apparatus 100, according to one or more embodiments.

The image processing apparatus 100 display views, e.g., through view images, from different viewpoints. In one or more embodiments, the view images may also be referred to view plane images, representing respective two-dimensional (2D) planes onto which 3D information is projected, such as a screen or a monitor surface, as only examples. The display of the different views may be simultaneous, and the different viewpoints may have different horizontal, vertical, and depth differences relative to the respective view plane.

In other words, the image processing apparatus 100 may employ a multi-view scheme for displaying multiple images from different viewpoints.

For example, as shown in FIG. 1, the image processing apparatus 100 may provide a viewer with 13 views 101 to 113, e.g., through 13 different view plane images, for 13 different respective viewpoints, as only an example. The image processing apparatus 100 may provide a second view 102 and a third view 103 for different viewpoints, e.g., to be respectively observed by a right eye and a left eye of a first viewer 190 based on a location of the first viewer 190. Similarly, as only an example, the image processing apparatus 100 may provide a fifth view 105 and a sixth view 106 for separate viewpoints, e.g., to be observed at the separate viewpoints representing by a right eye and a left eye of a second viewer 192, respectively, based on a location of the second viewer 192.

With the observation of the separate images for different viewpoints, the first viewer 190 and the second viewer 192 may each become aware of a stereoscopic image based on displayed images corresponding to the second view 102, the third view 103, the fifth view 105, and the sixth view 106. In the multi-view scheme, as only an example, the image processing apparatus may include 3D display elements that are configured to project the different viewpoint images toward their respective viewpoints, while a stereoscopic image may project different images toward a single viewpoint, e.g., a single viewpoint for the separate right and left eye images.

The third view 103, a seventh view 107, and an eleventh view 111 may be used as reference views and thus, may be referred to as reference views, or respective reference view images. The respective image data for reference views 103, 107, and 111, and depth/binocular disparity information 123, 127, and 131 of images corresponding to the reference views 103, 107, and 111 may be input to the image processing apparatus 100. In other words, the reference views 103, 107, and 111 may be input views, input to the image processing apparatus 100. Here, the term "depth/binocular disparity information" may indicate either one or both of depth information and binocular disparity information. Depth information or a corresponding depth image for a reference view may represent depths of pixels of the image data for the reference view, e.g., through observable and/or defined gradations or levels of depth. Such a depth image may represent different depths through lighter to darker colors or through lower to darker gray-scale values, as discussed below. Disparity information is based upon a premise that as objects move from far to close toward a camera the differences between left and right images increase. For example, the coordinate differences between the position of a point on an object captured in left and right images of the object would be minor or zero for very far away objects, while the same coordinate differences would increase as the object travels closer to the camera or as the camera is moved closer to the object. The depth/binocular disparity information may be input to the image processing apparatus or determined by the image processing apparatus, e.g., as an embodiment where the image processing apparatus is a video camera or where the depth/binocular disparity information is generated from input images without corresponding depth/binocular disparity information, as only examples.

Accordingly, the image processing apparatus 100 may generate and output the views 101 to 113, e.g., as respective view images or respective view planes. In one or more embodiments, the respective input image data of reference views 103, 107, and 111 may be respectively output from the image processing apparatus 100 unmodified. Therefore, herein, the reference views 103, 107, and 111, for example, may be used to generate some or all portions of the views 101 to 113.

Accordingly, the image processing apparatus 100 may generate the views 101, 102, 104 to 106, 108 to 110, 112, and 113, using one or more of the reference views 103, 107, and 111, for example, and the corresponding depth/binocular disparity information 123, 127, and 131.

In one or more embodiments, the image processing apparatus 100 may generate images corresponding to the views 104, 105, 106, 108, 109, and 110 through a view interpolation, using the reference views 103, 107, and 111, and the depth/binocular disparity information 123, 127, and 131. Here, the views 104, 105, and 106 may be placed between the reference views 103 and 107, and the views 108, 109, and 110 may be placed between the reference views 107 and 111, as shown in FIG. 1.

In one or more embodiments, the image processing apparatus 100 may generate images corresponding to the views 101, 102, 112, and 113 through a view extrapolation, using the reference views 103, 107, and 111, and the depth/binocular disparity information 123, 127, and 131. Here, the views 101, 102, 112, and 113 may be placed beyond a lateral range of the reference views 103, 107, and 111, as shown in FIG. 1. Compared to the generating of images through interpolation, where a reference image may be available on either side of the desired view, extrapolation refers to the circumstance where one or more reference images may be available only on one side of the desired view. The generating of views may be performed using view interpolation and/or extrapolation.

The view interpolation and the view extrapolation may be used to generate an image viewed from a predetermined viewpoint, based on reference view images (for example, images corresponding to the reference views 103, 107, and 111) and corresponding depth/binocular disparity information of the reference view images. Here, such an image may be generated by three-dimensional (3D) warping.

In a 3D system, a rectified image may be typically used, and one or more embodiments may use rectified reference view images. As will be explained further below, the 3D warping may be performed by shifting the x coordinate of a pixel in a reference view image using a depth and/or a binocular disparity of the pixel. Here, for example, the x coordinate value of the pixel may correspond to horizontal displacement and the y coordinate value of the pixel may correspond to vertical displacement, relative to an origin of the corresponding x-y coordinate system, noting that alternative coordinate systems are available.

In one or more embodiments, the 3D warping for a first pixel in a reference view image may be performed based on the below Equation 1, as only an example.

$$u_v = u_r + a \cdot d \qquad \text{Equation 1:}$$

Here, $u_r$ denotes an x coordinate of the first pixel in the reference view image, and $u_v$ denotes an x coordinate of a second pixel in the generated and output view image. The second pixel in the output view image may correspond to the first pixel in the reference view image, e.g., the second pixel of the output view image may be of the same point or area of the same object in the reference view image but have different coordinates due to the output view image being generated to represent a different viewpoint than the viewpoint of the reference view. Accordingly, an x coordinate of a predetermined pixel from the reference view image may be changed from $u_r$ to $u_v$ by Equation 1, to generate the new view image with the predetermined pixel located at $u_v$.

In Equation 1, a denotes location ratio information of the first pixel, and may have a value in proportion to a coordinate distance between the viewpoint of the reference view and the viewpoint of generated output view. Furthermore, d denotes a binocular disparity of the first pixel, and may be acquired from depth/binocular disparity information of the reference view image. The binocular disparity may be acquired from depth information of a pixel using a camera parameter. A coordinate distance between viewpoints refers to vertical or horizontal distances between viewpoints, as only an example.

Generally, as explained above, a depth of a pixel (or an image) may be inversely proportional to a binocular disparity of the pixel. Accordingly, information associated with "depth" may be replaced with "binocular disparity", or vice versa. In one or more embodiments, 3D warping may be performed using depth information and/or binocular disparity information of one or more reference view images.

Figure 2:
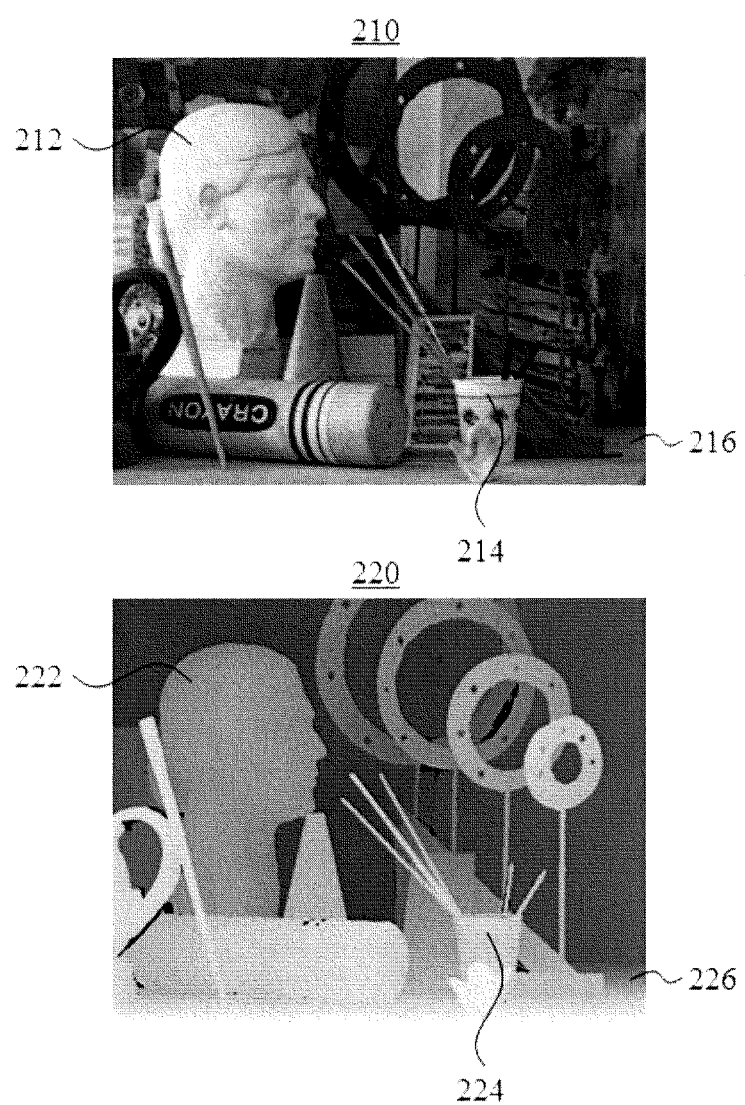
FIG. 2 illustrates a diagram of an example of a view image and an example of a corresponding depth/binocular disparity image, according to one or more embodiments.

FIG. 2 illustrates a diagram of an example of a view image and an example of a corresponding depth/binocular disparity image, according to one or more embodiments.

In FIG. 2, a view image 210 may be one of the reference views 103, 107, and 111 of FIG. 1, for example. The view image 210 may include at least one pixel, each of which have a color value, i.e., the view image 210 may be a color image, with the color value being represented by color component coordinates, for example, such as color values of red (R) green (G), and blue (B) being represented as (R,G,B).

Different pixels in the view image 210 may be used to represent points or areas of different predetermined objects in the view image 210.

For example, the view image 210 includes pixels representing a plaster bust 212 and pixels representing a cup 214.

The depth/binocular disparity image 220, corresponding to the view image 210, may be or have been obtained by representing, as an image, existing depth/binocular disparity information of the view image 210.

The depth/binocular disparity image 220 may include at least one pixel, each of which may respectively correspond to the same at least one pixel in the view image 210. In one or more embodiments, the resolutions of the view image 210 and the depth/binocular disparity image 220 may be the same, though the resolutions may be different, based on embodiment.

In FIG. 2, pixel values of each of the at least one pixel in the depth/binocular disparity image 220 may represent respective depth values or binocular disparity values of each of the at least one pixel in the view image 210.

For example, as noted above, when pixels in the view image 210 represent an object close to a viewpoint, from where the view image 210 is viewed, corresponding pixels in the depth/binocular disparity image 220 may appear with lighter color or lower gray scale, e.g., toward white. Conversely, when pixels in the view image 210 represent an object far away from the viewpoint, corresponding pixels in the depth/binocular disparity image 220 may appear with darker color or higher gray scale, e.g., toward black.

In other words, a color value of each of the at least one pixel in the depth/binocular disparity image 220 may be associated with (or, represent) a depth/binocular disparity value of each of the at least one pixel in the depth/binocular disparity image 220. A dark-colored or high gray scale pixel may indicate a high depth value, that is, a low binocular disparity value. Here, the term "depth/binocular disparity value" may indicate either one or both of a depth value and a binocular disparity value.

As only an example, in the depth/binocular disparity image 220, a portion 222 corresponding to the plaster bust 212 may appear darker in color or have a higher gray scale than a portion 224 corresponding to the cup 214, as the cup 214 is closer to the viewer than the plaster bust 212.

Additionally, as illustrated, some portions of a desk 216 of the view image 210 are closer to the viewer, i.e., closer to the viewpoint from where the view image 210 is viewed, compared to other portions. Accordingly, in the depth/binocular disparity image 220, a color or gray scale of a portion 226 corresponding to the desk 216 is illustrated as desk 226 with darker color or higher gray scale in the depth/binocular disparity image 220 in the farther edge of the desk 216 toward the lighter color or lower gray scale of closest edge or portions of the desk.

Figure 3:
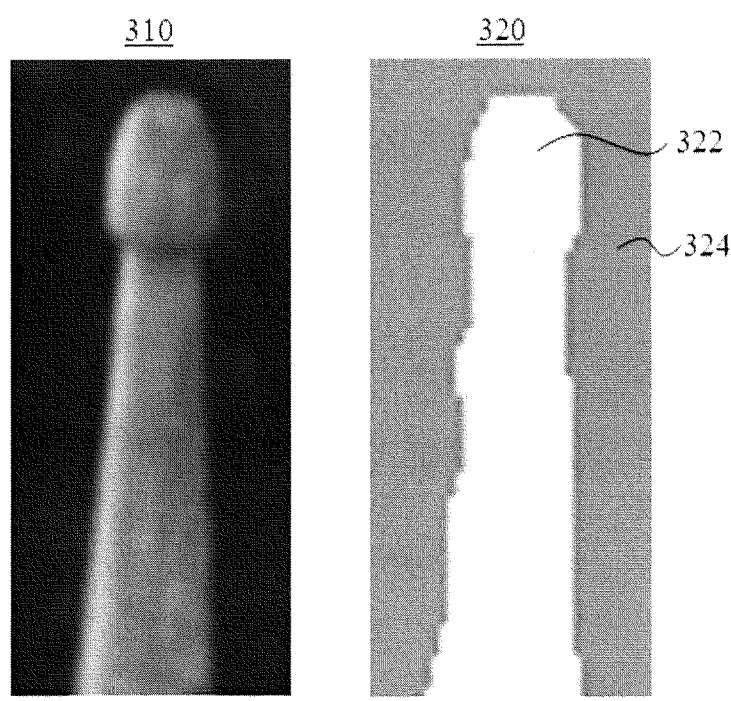
FIG. 3 illustrates a diagram of an example of inconsistency between a view image and a corresponding depth/binocular disparity image, according to one or more embodiments.

FIG. 3 illustrates a diagram of an example of inconsistency between a view image and a depth/binocular disparity image of the view image, according to one or more embodiments.

In FIG. 3, as illustrated, a view image 310 includes a centered object (or a foreground), and a background.

A depth/binocular disparity image 320 of the view image may include a lighter color or lower gray scale portion 322 corresponding to the object of view image 310, and a darker color or higher gray scale portion 324 corresponding to the background of the view image 310.

For the view image 310, an object edge in the view image 310 may be referred to as a boundary portion between the object and the background in the view image 310.

For the depth/binocular disparity image 320, a discontinuity point in the depth/binocular disparity image 320 may be referred to as a point where depth values are discontinuous in the depth/binocular disparity image 320. For example, the discontinuity point may include a point where the lighter color or lower gray scale portion 322 of the object comes into contact with the darker color or higher gray scale portion 324 of the background in the depth/binocular disparity image 320.

Ideally, in one or more embodiments, the object edge of the view image 310 would exactly coincide with the discontinuity point of the depth/binocular disparity image 320.

However, a generated depth image acquired using a depth camera, for example, or a binocular disparity image computed using stereo matching, also as only an example, may not in the end exactly coincide with the view image 310.

Specifically, among pixels in the depth/binocular disparity image 320, not all pixels corresponding to pixels representing the object in the view image 310 may have light color or low gray scale values. Additionally, among the pixels in the depth/binocular disparity image 320, not all pixels corresponding to pixels representing the background in the view image 310 may have dark color or gray scale values. For example, a lower portion of the object in the view image 310 may appear to have a straight edge, which should be represented by a straight edge in the depth/binocular disparity image 320, however, the corresponding portion of the depth/binocular disparity image 320 does not appear to have a straight edge. Additionally, the discontinuity point of the depth/binocular disparity image 320 may not appear as smooth as the edge shape of the object in the view image 310.

A depth/binocular disparity error may be used to refer to such inconsistencies between the object edge and the discontinuity point. Additionally, a depth/binocular disparity error for a predetermined pixel may indicate that the predetermined pixel in the view image 310 has an incorrect depth value or an incorrect binocular disparity value, e.g., which would result in the illustration of incorrect depths or binocular disparities, if the depth/binocular disparity image 320 was generated from the predetermined pixel.

Such depth/binocular disparity errors may occur mainly along an object boundary of the view image 310, for example.

However, when view interpolation or view extrapolation is performed, as described above and in greater detail below, an artifact may be generated due to the depth/binocular disparity error.

The generated artifact may result in lower image quality and accordingly, a viewer may feel or sense these differences when viewing a 3D image, due to the artifact, and the 3D effect may be reduced. The avoidance of such error and artifacts will be discussed in greater detail below.

Figure 4:
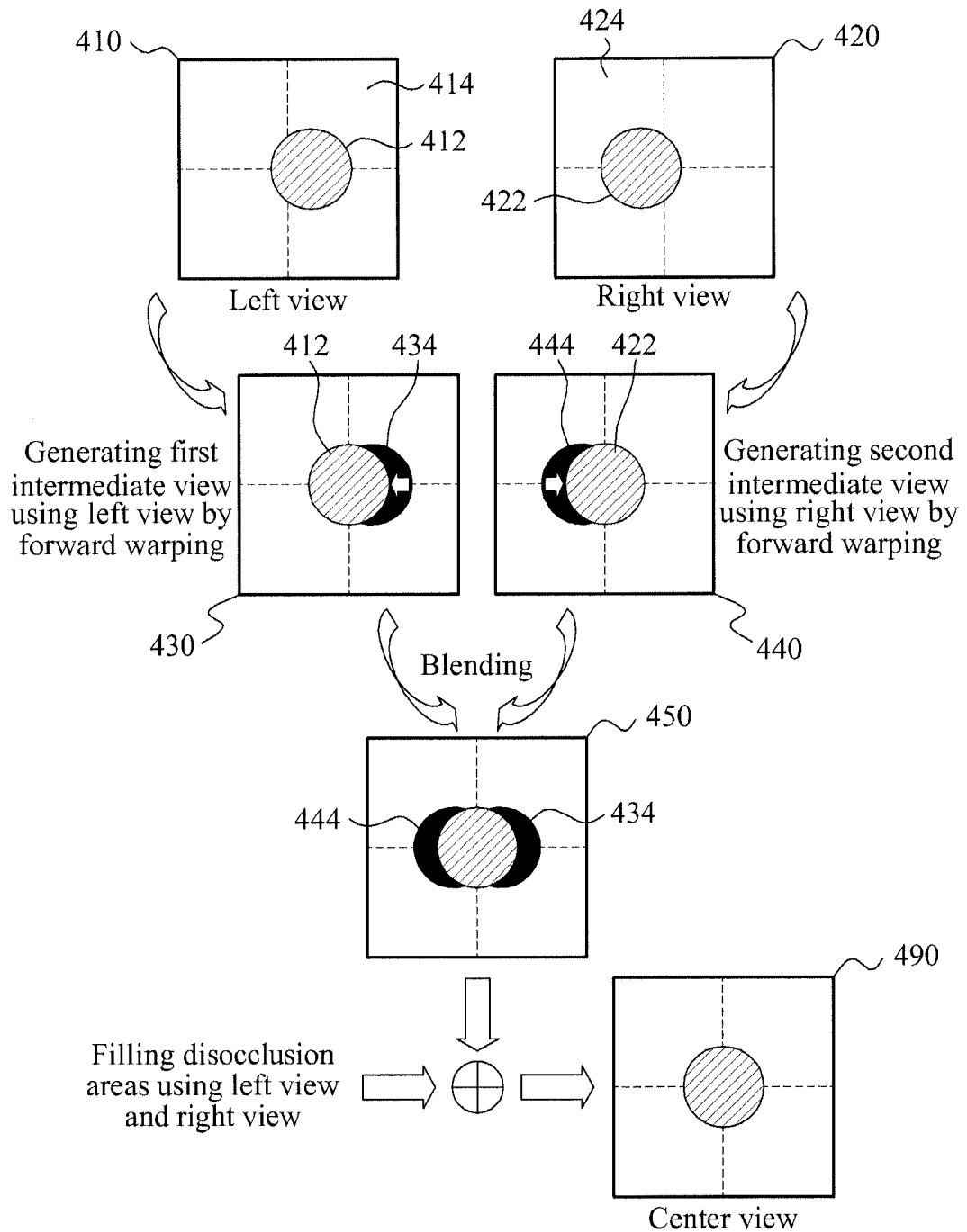
FIG. 4 illustrates a diagram of a method for generating a view corresponding to an intermediate viewpoint, according to one or more embodiments.

FIG. 4 illustrates a diagram of a method for generating a view corresponding to an intermediate viewpoint, according to one or more embodiments. The intermediate viewpoint may be a viewpoint envisioned to be positioned between two other viewpoints, i.e., the generated view corresponding to the intermediate viewpoint is a view of an object, for example, different from the views of the object from the two other viewpoints, e.g., from the respective viewpoints of the two reference views.

In FIG. 4, a center view 490 may be generated using two input views, namely a left view 410 and a right view 420, i.e., left and right from the perspective of an envisioned viewer of each respective view, depth/binocular disparity information of the left view 410, and depth/binocular disparity information of the right view 420. Here, the left view 410 and the right view 420 may be used as reference views, for example.

An envisioned viewpoint corresponding to the center view 490 may be envisioned as being placed between viewpoints corresponding to the left view 410 and the right view 420. Here, the viewpoint corresponding to the center view 490 may be referred to as a "center viewpoint".

As only example, the left view 410 may be the seventh view 107, and the right view 420 may be the third view 103 of FIG. 1.

A first intermediate view 430 from the left view 410 may be generated by forward warping using the left view 410 and the depth/binocular disparity information of the left view 410. For example, an object 412 in an image of the left view 410 may be shifted leftward by the 3D warping based on Equation 1, as described above. Similarly, a background 414 in the image of the left view 410 may have a binocular disparity value of "0", or an extremely low binocular disparity value, for example, and thus, the background 414 may not be or hardly be shifted leftward in the generated first intermediate view 430. The first intermediate view 430 may then be considered as corresponding to the above-described center viewpoint.

Here, compared to the object 412 and background 414 positioning in the left view 410, since the object 412 in the first intermediate view 430 is shifted further to the left than the background 414 in the first intermediate view 430, a portion 434 that was covered by the object 412 in the left view 410 may now appear in the first intermediate view 430. Here, the portion 434 may be referred to as a disocclusion area 434, i.e., the portion 434 was previously occluded in the left view 410. The disocclusion area 434 may be processed as a hole.

A second intermediate view 440 may be generated by forward warping using the right view 420 and the depth/binocular disparity information of the right view 420. Since an object 422 of right view 420 may be shifted further to the right in the second intermediate view 440 than a background 424 of the right view 420 in the second intermediate view 440, a portion 444 that was covered by the object 422 in the right view 420 may now appear in the second intermediate view 440. Here, the portion 444 may be referred to as a disocclusion area 444. The second intermediate view 440 may then be considered as also corresponding to the above-described center viewpoint.

An image corresponding to a third intermediate view 450 may then be generated by blending an image corresponding to the first intermediate view 430 with an image corresponding to the second intermediate view 440.

Accordingly, in one or more embodiments, the image corresponding to the third intermediate view 450 may still include both the disocclusion area 434 and the disocclusion area 444.

The disocclusion areas 434 and 444 in the third intermediate view 450 may be filled using the image corresponding to the left view 410 and the image corresponding to the right view 420, for example.

Specifically, the disocclusion area 434 in the image corresponding to the first intermediate view 430 may be filled, based on information on the background 424 in the image corresponding to the right view 420, for example pixels representing the background 424.

Similarly, the disocclusion area 444 in the image corresponding to the second intermediate view 440 may be filled, based on information on the background 414 in the image corresponding to the left view 410, for example pixels representing the background 414. Alternatively, the disocclusion areas 434 and 444 in the third intermediate view 450 may be filled based on the left view 410 and the right view 420, and thus the center view 490 may be generated.

In other words, in one or more embodiments, a disocclusion area or a hole generated by performing warping on an image corresponding to a first reference view may be filled, based on an image corresponding to a second reference view, as only examples.

View rendering, herein, may refer to generating views from different viewpoints using at least an image corresponding to a predetermined view and depth/binocular disparity information of the image, such as described above. Additionally, herein, image rendering may refer to generating images corresponding to views from different viewpoints using at least an image corresponding to a predetermined view and depth/binocular disparity information of the image.

Figure 5:
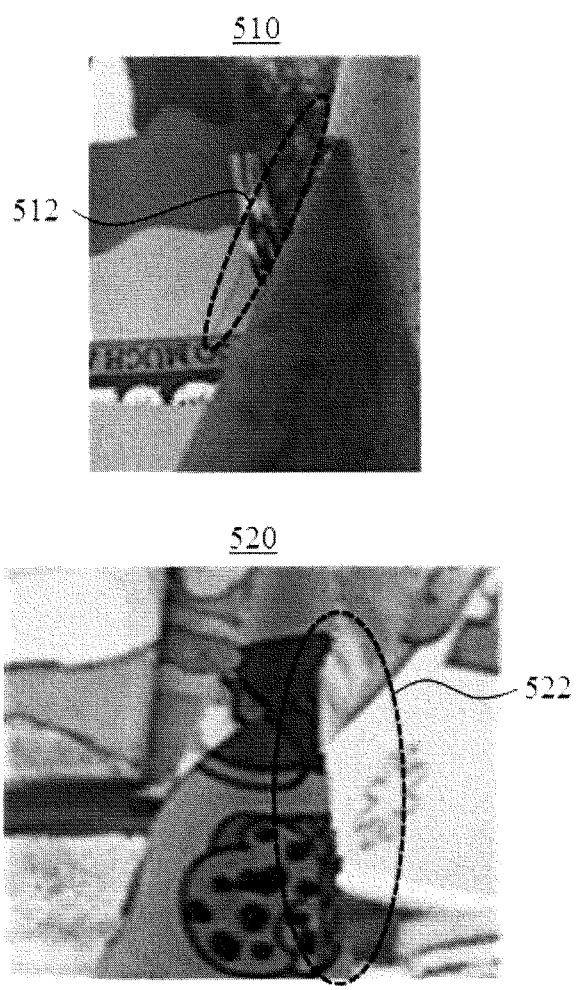
FIG. 5 illustrates a diagram of an example of an artifact generated in an image corresponding to an intermediate view, according to one or more embodiments.

FIG. 5 illustrates a diagram of an example of artifacts generated in images corresponding to an intermediate view, according to one or more embodiments.

In FIG. 5, a first image 510 and a second image 520 may have been generated by the above described view rendering, and each may respectively include artifacts 512 and 522, as illustrated.

The view rendering may have been performed using an image corresponding to a predetermined view, such as a reference view, and corresponding depth/binocular disparity information of the image.

When a depth/binocular disparity error occurs between an image and depth/binocular disparity information of the image, an artifact may be contained in an image generated by the view rendering using the image with the depth/binocular disparity error and depth/binocular disparity information.

For example, due to the depth/binocular disparity error, a pixel representing a foreground, namely an object, may incorrectly have a depth value that actually corresponds to a background. In this example, the pixel representing the foreground may not have been or hardly been shifted by warping and accordingly, corresponding information of the foreground, for example pixels representing an object, may incorrectly remain on the background. In other words, boundary noise may be generated. The artifact 512 of the first image 510 may be generated since information on the foreground wrongly remains in the background, as shown in FIG. 5.

Additionally, when depth/binocular disparity information is not exactly consistent with a boundary of an object, an aliasing problem may occur. When the aliasing problem occurs, a part or portion of the object may be lost. For example, the lost part or portion of the object may be wrongly filled with information from the background. The artifact 522 of the second image 520 illustrates the aliasing problem.

The artifacts 512 and 522 may reduce a quality of an image generated by a multi-view display, compared to the original quality of the reference image data provided to the image processing apparatus, for example.

Figure 6:
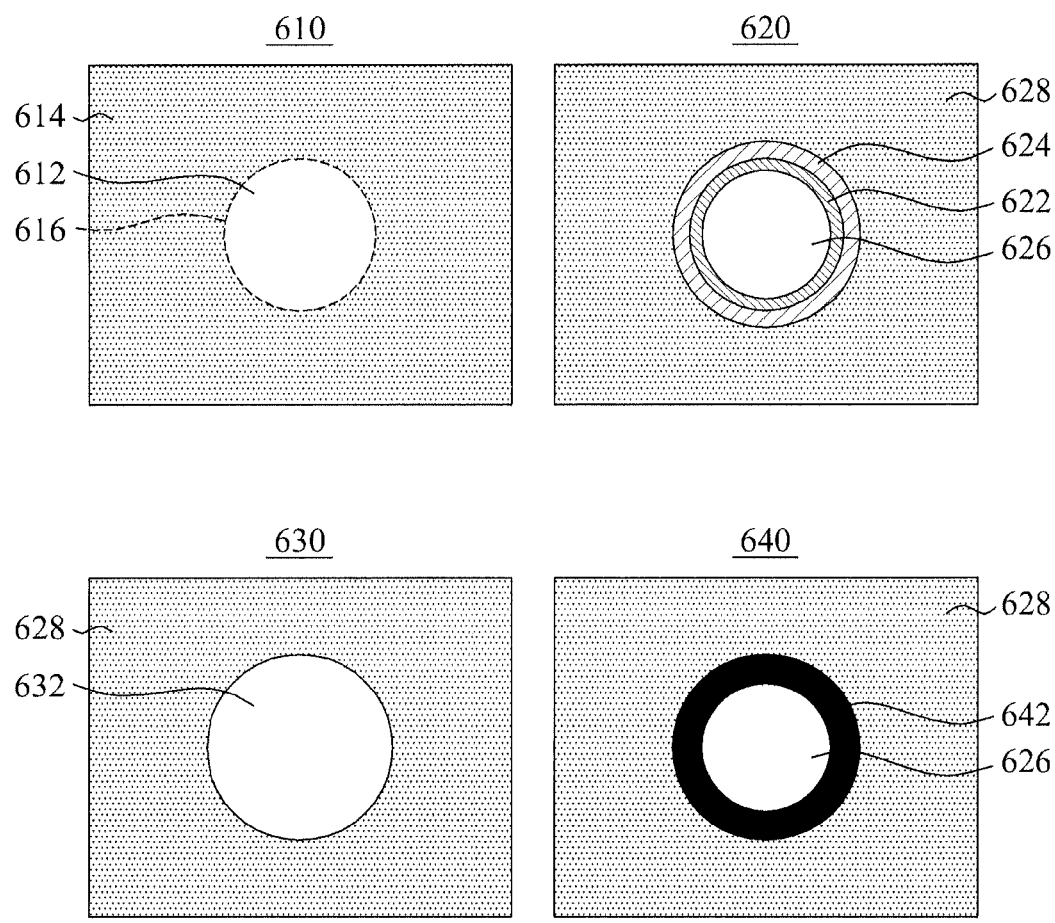
FIG. 6 illustrates a diagram of foreground-first warping and background-first warping, according to one or more embodiments.

FIG. 6 illustrates a diagram of foreground-first warping and background-first warping, according to one or more embodiments, e.g., as an example of the warping used to generate either of the first and second intermediate views 430 and 450 of FIG. 4.

In FIG. 6, a first depth/binocular disparity image 610 of a view image may be divided into a foreground area 612 and a background area 614, for example. The foreground area 612 may correspond to a foreground portion of the view image, and the background area 614 may correspond to the background portion of the view image.

In an example, the foreground area 612 may have a depth value less than a first predefined threshold value, or may have a binocular disparity value that is equal to or greater than a second predefined threshold value. In this example, the background area 614 may have a depth value that is equal to or greater than the first predefined threshold value, or may have a binocular disparity value less than the second predefined threshold value. In other words, the foreground area 612 and the background area 614 may be distinguished from each other, by comparing the depth values with the first predefined threshold value, or by comparing the binocular disparity values with the second predefined threshold value.

In another example, the background area 614 may have a maximum depth value, or may have a minimum binocular disparity value, for example a value of "0". In this example, the foreground area 612 may be obtained by excluding the background area 614 from the first depth/binocular disparity image 610.

In still another example, the background area 614 may have a depth/binocular disparity value within a predefined first range. In this example, the foreground area 612 may be obtained by excluding the background area 614 from the first depth/binocular disparity image 610, and may have a depth/binocular disparity value within a predefined second range.

The foreground area 612 and the background area 614 may be relatively distinguished. Specifically, an area having a higher depth value or a lower binocular disparity value may be defined as the background area 614, and an area having a lower depth value or a higher binocular disparity value may be defined as the foreground area 612 other than the background area 614.

Moreover, various other schemes for distinguishing the foreground area 612 and the background area 614 may be used.

In the first depth/binocular disparity image 610 of FIG. 6, a dotted line indicates an example discontinuous portion 616. The discontinuous portion 616 represents points or areas that have discontinuous depth/binocular disparity values.

The discontinuous portion 616 may correspond to a point where the foreground area 612 comes into contact with the background area 614, that is, a boundary between the foreground area 612 and the background area 614.

The discontinuous portion 616 may correspond to the object boundary described above.

A second depth/binocular disparity image 620 illustrates example error suspicious areas 622 and 624.

The error suspicious areas 622 and 624 may refer to areas where an error is suspected to occur or have occurred in a depth/binocular disparity value. In the error suspicious areas 622 and 624, due to a depth/binocular disparity error in a reference view image, an actual foreground portion may be likely to wrongly appear as a background, or an actual background portion may be likely to wrongly appear as a foreground.

Typically, for example, a depth/binocular disparity error may be highly likely to occur in a portion adjacent to the object boundary.

Accordingly, a portion adjacent to the discontinuous portion 616 may be set as an error suspicious area. Additionally, a portion or a pixel within a predetermined distance, i.e., coordinate distance, from the discontinuous portion 616 may be set or detected as an error suspicious area. For example, pixels within two pixels from the discontinuous portion 616 may be set as an error suspicious area, as only an example. A coordinate distance between pixels refers to vertical or horizontal distances between pixels, as only an example.

Accordingly, the depth information that falls within the error suspicious areas 622 and 624 may have a determined increased probability, e.g., either predefined or observed by the image processing apparatus, of being properly included either of in the foreground area 612 and the background area 614 of the first depth/binocular disparity image 610, respectively.

In the second depth/binocular disparity image 620, areas without the error suspicious areas 622 and 624 may be determined as a foreground area 626 or a background area 628 with greater confidence. In other words, the error suspicious areas 622 and 624 may be separated from the entire view image, as areas where occurrence of a depth/binocular disparity error is suspected.

A foreground-first warping depth/binocular disparity image 630 may be obtained by representing, as an image, foreground-first warping depth/binocular disparity information.

The foreground-first warping depth/binocular disparity information may be generated by regarding the error suspicious areas 622 and 624 as a foreground.

Depth/binocular disparity information of the foreground area 612 in the first depth/binocular disparity image 610 may be expanded to include the error suspicious areas 622 and 624 and accordingly, a foreground area 632 of the foreground-first warping depth/binocular disparity image 630 may be generated.

As an example of the expanding of the foreground area 612, the error suspicious areas 622 and 624 may be considered to have the same depth/binocular disparity values as those of the foreground area 612. Additionally, depth/binocular disparity values of the error suspicious areas 622 and 624 may be considered to be equal to a maximum value or a minimum value among the depth/binocular disparity values of the foreground area 612. Furthermore, pixels in the error suspicious areas 622 and 624 may be considered to have the same depth/binocular disparity values as those of most neighboring pixels in the foreground area 612. Moreover, the considered depth/binocular disparity values of the error suspicious areas 622 and 624 may be determined based on a distribution or change of depth/binocular disparity values of the foreground area 612.

A background area 628 of the foreground-first warping depth/binocular disparity image 630 may be identical to the background area 628 of the second depth/binocular disparity image 620, i.e., without the error suspicious areas 622 and 624. Accordingly, the background area 628 of the foreground-first warping depth/binocular disparity image 630 may have the same depth/binocular disparity values as those of a corresponding area of the first depth/binocular disparity image 610.

A background-first warping depth/binocular disparity image 640 may be obtained by representing, as an image, background-first warping depth/binocular disparity information.

The background-first warping depth/binocular disparity image 640 may be generated by regarding the error suspicious areas 622 and 624 as a hole 642. The hole 642 may be excluded from warping, that is, when a view image is generated by warping using the background-first warping depth/binocular disparity information, a portion of the generated view image that corresponds to the hole 642 may be restored using an image corresponding to another reference view and depth/binocular disparity information.

Depth/binocular disparity information of the background area 614 of the first depth/binocular disparity image 610 may be expanded to include the error suspicious areas 622 and 624 and accordingly, a background area 628 and 642 of the background-first warping depth/binocular disparity image 640 may be generated.

A foreground area 626 of the background-first warping depth/binocular disparity image 640 may be identical to the foreground area 626 of the second depth/binocular disparity image 620, i.e., without the error suspicious areas 622 and 624. Accordingly, the foreground area 626 of the background-first warping depth/binocular disparity image 640 may have the same depth/binocular disparity values as those of a corresponding area of the first depth/binocular disparity image 610.

The foreground-first warping may be performed using a view image, and corresponding foreground-first warping depth/binocular disparity information and thus, a foreground-first image may be generated without causing a loss of foreground information due to a depth/binocular disparity error. Specifically, when warping is performed without consideration of the depth/binocular disparity error, the foreground information may be lost due to the depth/binocular disparity error. However, the foreground-first image, as described above, may help prevent the loss of the foreground information.

The background-first warping may be performed using a view image, and corresponding background-first warping depth/binocular disparity information and thus, a background-first image where a boundary noise is removed may be generated. Specifically, when warping is performed without consideration of the depth/binocular disparity error, boundary noise may be generated due to a depth/binocular disparity error. However, the background-first image, as described above, may not contain or may reduce the boundary noise.

The background-first image may generate only a reliable background. In other words, a portion lacking from the background-first image, for example an unreliable background, may be filled based on another view image.

FIG. 7 illustrates a diagram of an example of blending a foreground-first image and a background-first image, according to one or more embodiments.

Since two images for a view corresponding to a predetermined viewpoint have been generated, the two generated images need to be blended into a single image.

The foreground-first image and the background-first image may be blended, so that an output view image may be generated.

As described above, the foreground-first warping depth/binocular disparity information, and the background-first warping depth/binocular disparity information may have different values in portions thereof corresponding to the error suspicious areas 622 and 624. Specifically, an area of the foreground-first image and an area of the background-first image that correspond to the error suspicious areas 622 and 624 may be different from each other.

For example, when an output view image is generated with respect to a part or all of the different areas by selectively using either the foreground-first image or the background-first image (that is, when pixels in areas of the output view image corresponding to the error suspicious areas 622 and 624 have the same color values as either pixels at the same coordinate in the foreground-first image or pixels at the same coordinate in the background-first image), artificial aliasing may occur in the different areas.

An aliasing problem occurring in an object boundary area and the like may be solved by blending the foreground-first image and the background-first image at a constant ratio.

Alpha matting may refer to the blending, such as through the below Equation 2, for example.

$$I = \alpha F + (1-\alpha) B \qquad \text{Equation 2:}$$

Here, I denotes a color value of a first pixel in an output view image, and F denotes a color value of a second pixel in a foreground-first image. The first pixel and the second pixel may correspond to each other, and may have the same coordinate value. B denotes a color value of a third pixel in a background-first image. The first pixel and the third pixel may correspond to each other, and may have the same coordinate value.

Specifically, the color value of the first pixel may be generated by alpha-matting the color value of the second pixel and the color value of the third pixel. The color value of the first pixel may be a weighted sum of the color value of the first pixel and the color value of the second pixel. Here, a weight for the color value of the second pixel may correspond to a blending coefficient $\alpha$, and a weight for the color value of the third pixel may correspond to a value of "$1-\alpha$".

Additionally, $\alpha$ may have a value equal to or greater than "0", and equal to or less than "1".

In FIG. 7, a first illustration 710 shows an output view image when a has $\alpha$ value of "0" or "1". In the first illustration 710, either a color value of a pixel in the foreground-first image, or a color value of a pixel in the background-first image may be selected as a color value of a pixel in the output view image.

Specifically, in a portion 712 where a has $\alpha$ value of "1", only the foreground-first image may be used to generate the output view image. In a portion 714 where a has $\alpha$ value of "0", only the background-first image may be used to generate the output view image.

Here, the foreground-first image and the background-first image may exist independently in the output view image. Accordingly, aliasing may occur in a portion of the output view image that corresponds to a boundary point 716 where the value of $\alpha$ is changed from "0" to "1", or from "1" to "0". The portion where the aliasing occurs may seem to be unnatural.

Additionally, a second illustration 720 of FIG. 7 shows an output view image when a has a value equal to or greater than "0", and equal to or less than "1". In the second illustration 720, a color value of a pixel in the output view image may be obtained by blending the color value of the pixel in the foreground-first image and the color value of the pixel in the background-first image at a constant ratio, for example.

The value of $\alpha$ may be computed with respect to only a portion of the output view image that corresponds to an error suspicious area, for example, because in a portion that does not correspond to the error suspicious area the foreground-first image and the background-first image have the same original color value.

The value of $\alpha$ may be computed based on color consistency.

A fourth pixel may be a pixel included in an error suspicious area, among pixels in a reference view image, Additionally, a fifth pixel may be a pixel most adjacent to the fourth pixel, among pixels in a foreground area of the reference view image.

Furthermore, a sixth pixel may be a pixel most adjacent to the fourth pixel, among pixels in a background area of the reference view image.

When a color consistency between a color value of the fourth pixel and a color value of the fifth pixel is high, $\alpha$ may have a value close to "1". In other words, when both the fourth pixel and the fifth pixel have similar color values, the fourth pixel may be highly likely to represent a foreground, namely an object. Accordingly, due to a having the value close to "1", a larger number of color values of pixels in the foreground-first image may be reflected during blending.

The color consistency between the color value of the fourth pixel and the color value of the fifth pixel may be computed based on a first Euclidean distance, for example, between a color component coordinate of the color value of the fourth pixel and a color component coordinate of the color value of the fifth pixel.

In one or more embodiments, various color component coordinates for representing colors, such as RGB coordinates or YCbCr coordinates, may be used to calculate the Euclidean distance.

When color consistency between a color value of the fourth pixel and a color value of the sixth pixel is high, $\alpha$ may have a value close to "0". In other words, when both the fourth pixel and the sixth pixel have similar color values, the fourth pixel may be highly likely to represent a background. Accordingly, due to a having the value close to "0", a larger number of color values of pixels in the background-first image may be reflected during blending.

The color consistency between the color value of the fourth pixel and the color value of the sixth pixel may be computed based on a second Euclidean distance between a color component coordinate of the color value of the fourth pixel and a color component coordinate of the color value of the sixth pixel.

Accordingly, the value of $\alpha$ may be determined based on a ratio between the first Euclidean distance and the second Euclidean distance.

The value of $\alpha$ may also be determined based on a foreground distance and a background distance.

The foreground distance may be a shortest coordinate distance between the fourth pixel and the foreground area of the reference view image. In other words, the foreground distance may be a coordinate distance between the fourth pixel and the fifth pixel.

The background distance may be a shortest coordinate distance between the fourth pixel and the background area of the reference view image. In other words, the background distance may be a coordinate distance between the fourth pixel and the sixth pixel.

Accordingly, the value of $\alpha$ may be determined based on a ratio between the foreground distance and the background distance.

Figure 8:
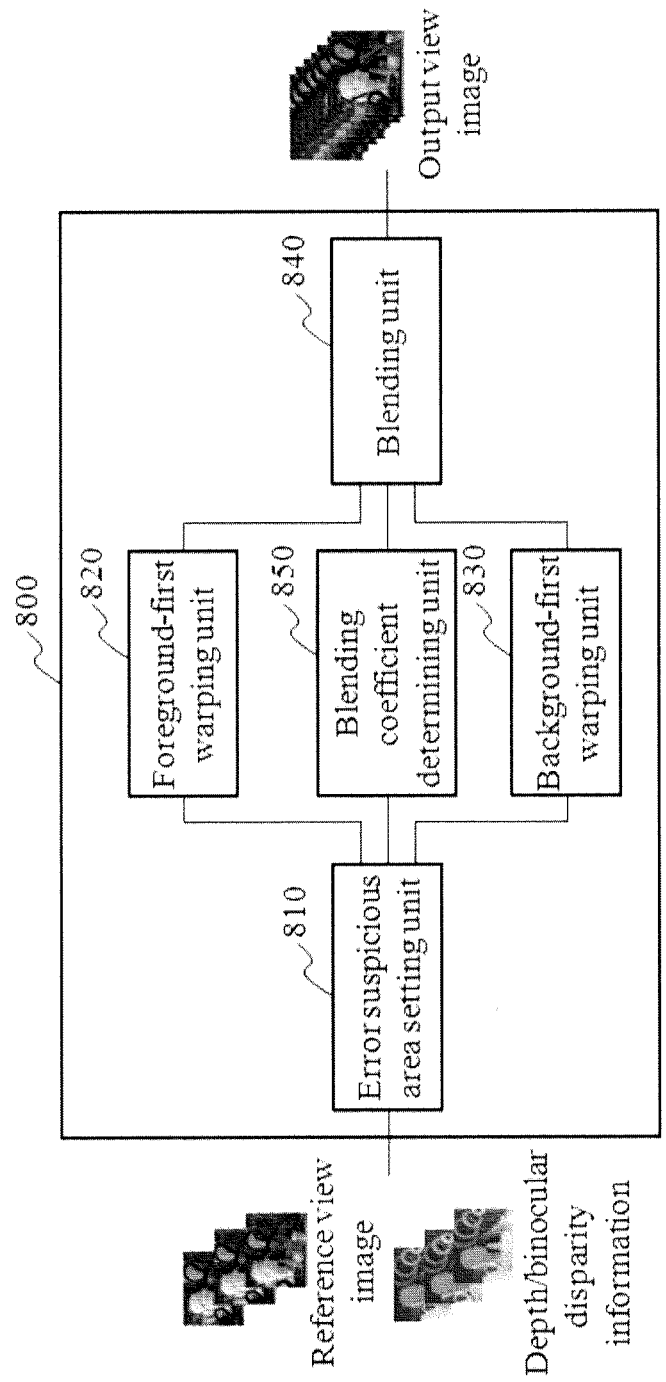
FIG. 8 illustrates a block diagram of components of an image processing apparatus, according to one or more embodiments.

FIG. 8 illustrates a block diagram of components of an image processing apparatus 800, according to one or more embodiments.

The image processing apparatus 800 of FIG. 8 may prevent or attempt to avoid an artifact from occurring or being observed in view rendering due to a depth/binocular disparity error, and may thus generate a high-quality multi-view image.

The image processing apparatus 800 may generate an output view image based on a reference view image corresponding to a first reference view, and based on depth/binocular disparity information of the reference view image.

An output view may correspond to a predetermined viewpoint.

As shown in FIG. 8, the image processing apparatus 800 may include an error suspicious area setting unit 810, a foreground-first warping unit 820, a background-first warping unit 830, and a blending unit 840, as such components, according to one or more embodiments.

The error suspicious area setting unit 810 may detect an error suspicious area in the reference view image, based on the depth/binocular disparity information.

The foreground-first warping unit 820 may perform foreground-first warping on the reference view image, and may generate a foreground-first image.

The background-first warping unit 830 may perform background-first warping on the reference view image, and may generate a background-first image.

The background-first warping unit 830 may generate a portion of the background-first image that corresponds to the error suspicious area, based on at least one second reference view image corresponding to a respective second reference view.

The blending unit 840 may blend the foreground-first image and the background-first image, and may generate the output view image.

When color values of pixels in an error suspicious area of the output view image are generated, the blending unit 840 may alpha-matte a color value of a first pixel in the foreground-first image and a color value of a second pixel in the background-first image, and may generate a color value of a third pixel in the output view image. Here, the positions of the second pixel and the third pixel may correspond to the position of the first pixel.

The color value of the third pixel may be a weighted sum of the color value of the first pixel and the color value of the second pixel. Here, a weight for the color value of the first pixel may be a blending coefficient $\alpha$, and a weight for the color value of the second pixel may be a value of "$1-\alpha$", for example.

The image processing apparatus 800 may further include a blending coefficient determining unit 850 component to determine the blending coefficient $\alpha$.

The blending coefficient determining unit 850 may determine the blending coefficient $\alpha$ based on a first color consistency and a second color consistency. Here, the first color consistency may be computed based on a Euclidean distance between a color component coordinate of a color value of a fourth pixel in the reference view image and a color component coordinate of a color value of a foreground adjacent to the fourth pixel, for example. The second color consistency may be computed based on a Euclidean distance between the color component coordinate of the color value of the fourth pixel and a color component coordinate of a color value of a background adjacent to the fourth pixel, as an example. Additionally, the position of the fourth pixel may correspond to the position of the third pixel.

The blending coefficient determining unit 850 may also determine the blending coefficient $\alpha$, based on a first distance and a second distance. Here, the first distance may be a shortest coordinate distance between the third pixel and a foreground, and the second distance may be a shortest coordinate distance between the third pixel and a background.

The image processing apparatus 800 may be used to generate a stereo image or a multi-view image. Specifically, the image processing apparatus 800 may perform a view interpolation and/or a view extrapolation, to generate a stereo image and/or a multi-view image.

A series of operations or a method for performing the view interpolation or the view extrapolation may be combined with operations of the image processing apparatus 800, according to one or more embodiments.

Technical information described above with reference to FIGS. 1 to 7 may equally be applied to one or more embodiments and accordingly, further descriptions thereof will be omitted.

Figure 9:
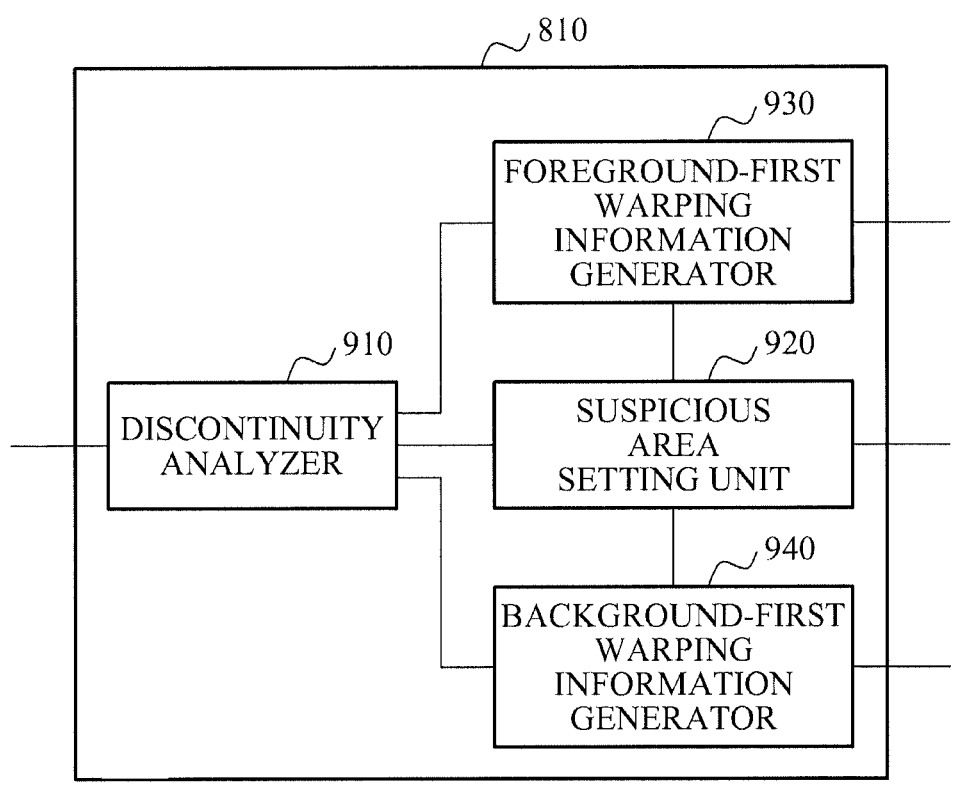
FIG. 9 illustrates a block diagram of components of an error suspicious area setting unit, such as the error suspicious area setting unit 810 of FIG. 8, according to one or more embodiments.

FIG. 9 illustrates a block diagram of components of the error suspicious area setting unit 810 of FIG. 8, according to one or more embodiments.

As shown in FIG. 9, the error suspicious area setting unit 810 may include a discontinuity analyzer 910, a suspicious area setting unit 920, a foreground-first warping information generator 930, and a background-first warping information generator 940, as such components, according to one or more embodiments.

The discontinuity analyzer 910 may detect a discontinuous portion from the depth/binocular disparity information corresponding to the reference view image.

The suspicious area setting unit 920 may set the error suspicious area in the reference view image, based on the detected discontinuous portion.

The suspicious area setting unit 920 may set, as the error suspicious area, a portion within a predetermined distance from the discontinuous portion, in the reference view image.

The foreground-first warping information generator 930 may generate foreground-first warping depth/binocular disparity information.

Specifically, the foreground-first warping information generator 930 may expand depth/binocular disparity information of a foreground portion adjacent to the discontinuous portion to the error suspicious area, to generate the foreground-first warping depth/binocular disparity information.

The background-first warping information generator 940 may generate background-first warping depth/binocular disparity information.

Specifically, the background-first warping information generator 940 may exclude the error suspicious area from warping, to generate the background-first warping depth/binocular disparity information.

The background-first warping information generator 940 may regard the discontinuous portion as a hole, exclude the discontinuous portion from the warping, and fill the whole, as described above.

The foreground-first warping unit 820 may generate a foreground-first image based on the generated foreground-first warping depth/binocular disparity information. Additionally, the background-first warping unit 830 may generate a background-first image, based on the generated background-first warping depth/binocular disparity information.

Technical information described above with reference to FIGS. 1 to 8 may equally be applied to one or more embodiments and accordingly, further descriptions thereof will be omitted.

FIG. 10 illustrates a flowchart of an image processing method, according to one or more embodiments.

The image processing method of FIG. 10 may be used to generate an output view image from a predetermined viewpoint, based on a reference view image corresponding to a first reference view from a reference viewpoint, and based on depth/binocular disparity information of the reference view image.

First, operations 1010 to 1040 may be performed to set an error suspicion area.

In operations 1010 to 1040, an error suspicious area may be detected from the reference view image based on the depth/binocular disparity information. Plural suspicious areas may be further determined within such a detected error suspicious area.

Specifically, in operation 1010, a discontinuous portion may be detected from the depth/binocular disparity information.

In operation 1020, the error suspicious area may be set in the reference view image based on the detected discontinuous portion.

Additionally, in the reference view image, a portion within a predetermined coordinate distance from the discontinuous portion may be set as the error suspicious area.

In operation 1030, depth/binocular disparity information of a foreground portion adjacent to the discontinuous portion may be expanded to the error suspicious area, and foreground-first warping depth/binocular disparity information may be generated.

In operation 1040, background-first warping depth/binocular disparity information may be generated by excluding the error suspicious area from a warping.

The discontinuous portion may be regarded as a hole, excluded from the warping, and filled, as described above.

In operation 1050, foreground-first warping may be performed, and a foreground-first image may be generated. In the foreground-first warping, a portion of the reference view image corresponding to the error suspicious area may be regarded as a foreground.

Here, the foreground-first image may be generated based on the foreground-first warping depth/binocular disparity information.

In operation 1060, background-first warping may be performed, and a background-first image may be generated. In the background-first warping, the portion of the reference view image corresponding to the error suspicious area may be excluded from the warping.

Additionally, a portion of the background-first image that corresponds to the error suspicious area may be generated based on a reference view image corresponding to a second reference view.

The background-first image may be generated based on the background-first warping depth/binocular disparity information.

In operation 1070, a blending coefficient $\alpha$ may be determined.

Here, the blending coefficient $\alpha$ may be determined based on a first color consistency and a second color consistency, as only examples.

A first pixel may be included in the foreground-first image. A second pixel may be included in the background-first image, and may positionally correspond to the first pixel. Additionally, as only further examples, a third pixel may be included in the output view image, and may positionally correspond to the first pixel.

The first color consistency may be computed based on a Euclidean distance between a color component coordinate of a color value of a fourth pixel in the reference view image and a color component coordinate of a color value of a foreground adjacent to the fourth pixel, for example. Here, the fourth pixel may positionally correspond to the third pixel.

The second color consistency may be computed based on a Euclidean distance between the color component coordinate of the color value of the fourth pixel and a color component coordinate of a color value of a background adjacent to the fourth pixel, for example.

Additionally, the blending coefficient $\alpha$ may be determined based on a first distance and a second distance. Here, in one or more embodiments, the first distance may be a shortest coordinate distance between the third pixel and a foreground, and the second distance may be a shortest coordinate distance between the third pixel and a background.

In operation 1080, the foreground-first image and the background-first image may be blended, and the output view image may be generated.

In operation 1080, when color values of pixels in the error suspicious area of the output view image are generated, alpha matting may be performed on a color value of the first pixel and a color value of the second pixel, and a color value of the third pixel may be generated.

The color value of the third pixel may be a weighted sum of the color value of the first pixel and the color value of the second pixel. A weight for the color value of the first pixel may be a blending coefficient $\alpha$, and a weight for the color value of the second pixel may be a value of "1−$\alpha$", for example.

Technical information described above with reference to FIGS. 1 to 9 may equally be applied to one or more alternate and/or additional embodiments, and accordingly, further descriptions thereof will be omitted.

In one or more embodiments, any apparatus, system, and unit or component descriptions herein include one or more hardware devices and/or hardware processing elements/devices. For example, each of such hardware devices or the apparatus/system as a whole may include one or more processing devices. Additionally, in one or more embodiments, any described apparatus, system, and unit or component may further include one or more desirable memories, and any desired hardware input/output transmission devices, as only further examples. Further, the term apparatus should be considered synonymous with elements of a physical system, not limited to a device, i.e., a single device at a single location, or enclosure, or limited to all described elements being embodied in single respective element/device or enclosures in all embodiments, but rather, depending on embodiment, is open to being embodied together or separately in differing devices or enclosures and/or differing locations through differing hardware elements, with embodiments also including such a single device at a single location or in a single enclosure.

In addition to the above described embodiments, embodiments can also be implemented through computer readable code/instructions in/on a non-transitory medium, e.g., a computer readable recording medium, to control at least one processing element/device, such as a processor, computing device, computer, or computer system with peripherals, to implement any above described embodiment or aspect of any embodiment by execution of such computer readable code/instructions. The medium can correspond to any defined, measurable, and tangible structure permitting the storing and/or transmission of the computer readable code. Additionally, as noted above, one or more embodiments may include the at least one processing device.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and/or perform program instructions, such as read-only memory (ROM), random access memory (RAM), flash memory, and the at least one processing device, respectively. Computer readable code may include both machine code, such as produced by a compiler, and files containing higher level code that may be executed by the computer using an interpreter, for example. The media may also be any defined, measurable, and tangible elements of one or more distributed networks, so that the computer readable code is stored and/or executed in a distributed fashion. In one or more embodiments, such distributed networks do not require the computer readable code to be stored at a same location, e.g., the computer readable code or portions of the same may be stored remotely, either stored remotely at a single location, potentially on a single medium, or stored in a distributed manner, such as in a cloud based manner. Still further, as noted and only as an example, the processing element could include a processor or a computer processor, and processing elements may be distributed and/or included in a single device. There may be more than one processing element and/or processing elements with plural distinct processing elements, e.g., a processor with plural cores, in which case one or more embodiments would include hardware and/or coding to enable single or plural core synchronous or asynchronous operation.

The computer-readable media may also be embodied in at least one application specific integrated circuit (ASIC) or Field Programmable Gate Array (FPGA), or similar devices, as only examples, which execute (processes like a processor) code or program instructions.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

What is claimed is:

1. An image processing apparatus including one or more processing devices controlled to generate an output view image for an output viewpoint based on a reference view image corresponding to a first reference view for a reference viewpoint, and depth/binocular disparity information of the reference view image, the image processing apparatus comprising:

a foreground-first warping unit, among the one or more of processing devices and controlled to generate a foreground-first image corresponding to the output viewpoint, which is different than the reference viewpoint, by performing a foreground-first warping of a foreground of the reference view image that regards a portion of the reference view image corresponding to a detected error suspicious area as being included in the foreground of the reference view image, with the detected error suspicious area being one or more areas of the reference view image having a determined increased probability of depth disparity error based on the depth/binocular disparity information of the reference view image;

a background-first warping unit, among the one or more of processing devices and controlled to generate a background-first image by performing a background-first warping of a background of the reference view image that excludes the portion of the reference view image corresponding to the error suspicious area; and a blending unit, among the one or more of processing devices and controlled to blend the foreground-first image and the background-first image to generate the output view image for the output viewpoint, wherein the error suspicious area excluded from the background-first warping of the background-first image is replaced based on background information from another reference view image and viewpoint thereof to perform the blending of the foreground-first image and the background-first image, and to generate the output view image generated by the blending.

2. The image processing apparatus of claim 1, wherein, when color values of pixels in an error suspicious area of the output view image are generated, the blending unit alpha-mattes a color value of a first pixel in the foreground-first image and a color value of a second pixel in the background-first image, and generates a color value of a third pixel in the output view image, wherein positions of the second pixel and the third pixel correspond to a position of the first pixel.

3. The image processing apparatus of claim 2, wherein the color value of the third pixel is a weighted sum of the color value of the first pixel and the color value of the second pixel, wherein a weight for the color value of the first pixel is a blending coefficient $\alpha$, and a weight for the color value of the second pixel is a value of "1–$\alpha$".

4. The image processing apparatus of claim 3, further comprising:
   a blending coefficient determining unit, among the one or more of processing devices and controlled to determine the blending coefficient $\alpha$,
   wherein the blending coefficient determining unit determines the blending coefficient $\alpha$ based on a first color consistency and a second color consistency, wherein the first color consistency is computed based on a Euclidean distance between a color component coordinate of a color value of a fourth pixel in the reference view image corresponding to the third pixel and a color component coordinate of a color value of a foreground adjacent to the fourth pixel, and the second color consistency is computed based on a Euclidean distance between the color component coordinate of the color value of the fourth pixel and a color component coordinate of a color value of a background adjacent to the fourth pixel.

5. The image processing apparatus of claim 3, further comprising:
   a blending coefficient determining unit, among the one or more of processing devices and controlled to determine the blending coefficient $\alpha$,
   wherein the blending coefficient determining unit determines the blending coefficient $\alpha$ based on a first distance and a second distance, wherein the first distance is a shortest distance between the third pixel and the foreground, and the second distance is a shortest distance between the third pixel and the background.

6. The image processing apparatus of claim 1, further comprising:
   a discontinuity analyzer, among the one or more of processing devices and controlled to detect a discontinuous portion from the depth/binocular disparity information of the reference view image, the foreground and background being adjacent to the discontinuous portion;
   a suspicious area setting unit, among the one or more of processing devices and controlled to set the error suspicious area in the reference view image based on the detected discontinuous portion;
   a foreground-first warping information generator, among the one or more of processing devices and controlled to generate foreground-first warping depth/binocular disparity information by expanding depth/binocular disparity information of the foreground to include the error suspicious area to selectively adjust depth/binocular disparity information of the error suspicious area based on the depth/binocular disparity information of the foreground; and
   a background-first warping information generator, among the one or more of processing devices and controlled to generate background-first warping depth/binocular disparity information of the background excluding the error suspicious area,
   wherein the foreground-first warping unit generates the foreground-first image based on the foreground-first warping depth/binocular disparity information, and the background-first warping unit generates the background-first image based on the background-first warping depth/binocular disparity information.

7. The image processing apparatus of claim 6, wherein the suspicious area setting unit sets, as the error suspicious area, a portion within a predetermined distance from the discontinuous portion, in the reference view image.

8. The image processing apparatus of claim 1, wherein the foreground-first warping includes respective shifting of information of the reference image at a coordinate of the reference image to a different coordinate in the foreground-first image so as to generate the foreground-first image to be from the output viewpoint different from the reference viewpoint.

9. The image processing apparatus of claim 8, wherein the different coordinate is based on the depth/binocular disparity information for the coordinate of the reference image.

10. The image processing apparatus of claim 9, wherein the different coordinate is based on the depth/binocular disparity information for the coordinate of the reference image and a location ratio, the location ratio representing a difference between the output viewpoint and the reference viewpoint.

11. The image processing apparatus of claim 1, wherein the another reference view image viewpoint is different from the reference viewpoint of the first reference view.

12. The image processing apparatus of claim 11, wherein the another reference view image viewpoint is different from the output viewpoint.

13. An image processing method of generating an output view image for an output viewpoint based on a reference view image corresponding to a first reference view for a reference viewpoint, and depth/binocular disparity information of the reference view image, the image processing method being performed by one or more processors and comprising:
   performing a foreground-first warping of a foreground of the reference view image, that regards a portion of the reference view image corresponding to a detected error suspicious area as being included in the foreground of the reference view image, to generate a foreground-first image corresponding to the output viewpoint, which is different than the reference viewpoint, with the detected error suspicious area being one or more areas of the reference view image having a determined increased probability of depth disparity error based on the depth/binocular disparity information of the reference view image;
   performing a background-first warping of a background of the reference view image, that excludes the portion of the reference view image corresponding to the error suspicious area, to generate a background-first image; and
   blending the foreground-first image and the background-first image, and generating the output view image for the output viewpoint,
      wherein the error suspicious area excluded from the background-first warping of the background-first image is replaced based on the background information from another reference view image and viewpoint thereof to perform the blending of the foreground-first image and the background-first image, and to generate the output view image generated by the blending.

14. The image processing method of claim 13, wherein the blending comprises, when color values of pixels in an error suspicious area of the output view image are generated, alpha-matting a color value of a first pixel in the foreground-first image and a color value of a second pixel in the background-first image, and generating a color value of a third pixel in the output view image, wherein positions of the second pixel and the third pixel correspond to a position of the first pixel.

15. The image processing method of claim 14, wherein the color value of the third pixel is a weighted sum of the color value of the first pixel and the color value of the second pixel, wherein a weight for the color value of the first pixel is a blending coefficient $\alpha$, and a weight for the color value of the second pixel is a value of "1−$\alpha$".

16. The image processing method of claim 15, further comprising:
determining the blending coefficient $\alpha$,
wherein the determining comprises determining the blending coefficient $\alpha$ based on a first color consistency and a second color consistency, wherein the first color consistency is computed based on a Euclidean distance between a color component coordinate of a color value of a fourth pixel in the reference view image corresponding to the third pixel and a color component coordinate of a color value of a foreground adjacent to the fourth pixel, and the second color consistency is computed based on a Euclidean distance between the color component coordinate of the color value of the fourth pixel and a color component coordinate of a color value of a background adjacent to the fourth pixel.

17. The image processing method of claim 15, further comprising:
determining the blending coefficient $\alpha$,
wherein the determining comprises determining the blending coefficient $\alpha$ based on a first distance and a second distance, wherein the first distance is a shortest distance between the third pixel and the foreground, and the second distance is a shortest distance between the third pixel and the background.

18. The image processing method of claim 13, wherein the detecting comprises:
detecting a discontinuous portion from the depth/binocular disparity information of the reference view image;
setting the error suspicious area in the reference view image based on the detected discontinuous portion;
generating foreground-first warping depth/binocular disparity information by warping a foreground through an expanding of depth/binocular disparity information of the foreground to include the error suspicious area by selectively adjusting depth/binocular disparity information of the error suspicious area based on the depth/binocular disparity information of the foreground, the foreground being adjacent to the discontinuous portion; and
generating background-first warping depth/binocular disparity information of the background excluding the error suspicious area,
wherein the performing of the foreground-first warping comprises generating the foreground-first image based on the foreground-first warping depth/binocular disparity information, and the performing of the background-first warping comprises generating the background-first image based on the background-first warping depth/binocular disparity information.

19. The image processing method of claim 18, wherein the setting comprises setting, as the error suspicious area, a portion within a predetermined distance from the discontinuous portion, in the reference view image.

20. The image processing method of claim 18, wherein the generating of the background-first warping depth/binocular disparity information comprises regarding the discontinuous portion as a hole, excluding the discontinuous portion from the background-first warping, and replacing the hole based on background information from the another reference view image.

21. A non-transitory computer readable recording medium comprising computer readable code to control at least one processing device to implement the method of claim 13.

22. The image processing method of claim 13, wherein the foreground-first warping includes respective shifting of information of the reference image at a coordinate of the reference image to a different coordinate in the foreground-first image so as to generate the foreground-first image to be from the output viewpoint different from the reference viewpoint.

23. The image processing method of claim 22, wherein the different coordinate is based on the depth/binocular disparity information for the coordinate of the reference image.

24. The image processing method of claim 23, wherein the different coordinate is based on the depth/binocular disparity information for the coordinate of the reference image and a location ratio, the location ratio representing a difference between the output viewpoint and the reference viewpoint.

25. The image processing method of claim 13, wherein the another reference view image viewpoint is different from the reference viewpoint of the first reference view.

26. The image processing method of claim 25, wherein the another reference view image viewpoint is different from the output viewpoint.

27. An image processing apparatus comprising one or more processing devices controlled to generate a first intermediate center view image for a center viewpoint based on a first reference view image, illustrating at least one object, from a first reference viewpoint, and depth/binocular disparity information of the first reference view image, the image processing apparatus comprising:
a first warping unit, among the one or more processing devices and controlled to warp the first reference view image, by respectively warping at least one foreground of the first reference view image and at least one background of the first reference view image to generate the first intermediate center view image for the center viewpoint, different from the first reference viewpoint, wherein the warping of the at least one foreground and the at least one background of the first reference view image are differently performed based upon a detected error suspicious area of the first reference view image, the detected error suspicious area being one or more areas of the first reference view image having a determined increased probability of depth disparity error based on the depth/binocular disparity information of the first reference view image, with the warping of the at least one foreground including regarding the detected error suspicious area as being respectively included in the at least one foreground; and an output unit, among the one or more of processing devices and controlled to output the first intermediate center view image as an additional view image that includes the at least one object, from the center viewpoint,
wherein the warping of the at least one background excludes the error suspicious area, which is replaced based on background information from a second reference view image.

28. The image processing apparatus of claim 27, to further generate a second intermediate center view image for the center viewpoint based on the second reference view image, illustrating the at least one object, from a second reference viewpoint, and depth/binocular disparity information of the second reference view image, the image processing apparatus further comprising:
a second warping unit, among the one or more processing devices and controlled to warp the second reference view image by respectively warping at least one foreground of the second reference view image and at least one background of the second reference view image to generate the second intermediate center view image for the center viewpoint, different from the second reference viewpoint, wherein the warping of the at least one foreground and the at least one background of the second reference view image are differently performed based upon a detected error suspicious area of the second reference view image, the detected error suspicious area of the second reference view image being one or more areas of the second reference view image having a determined increased probability of depth disparity error based on the depth/binocular disparity information of the second reference view image, with the warping of the at least one foreground of the second reference view image including regarding the detected error suspicious area of the second reference view image as being respectively included in the at least one foreground;
a blending unit to blend the first intermediate center view image with the second intermediate center view image to generate a center view image from the center viewpoint; and
an output unit to output the center view image as an additional view image that includes the at least one object, from the center viewpoint.

29. An image processing method generating a first intermediate center view image for a center viewpoint based on a first reference view image, illustrating at least one object, from a first reference viewpoint, and depth/binocular disparity information of the first reference view image, the image processing method comprising:
respectively warping at least one foreground of the first reference view image and at least one background of the first reference view image to generate the first intermediate center view image for the center viewpoint, different from the first reference viewpoint, wherein the warping of the at least one foreground and the at least one background of the first reference view image are differently performed based upon a detected error suspicious area of the first reference view image, the detected error suspicious area being one or more areas of the first reference view image having a determined increased probability of depth disparity error based on the depth/binocular disparity information of the first reference view image, with the warping of the at least one foreground including regarding the detected error suspicious area as being respectively included in the at least one foreground; and
outputting the first intermediate center view image as an additional view image that includes the at least one object, from the center viewpoint,
wherein the warping of the at least one background excludes the error suspicious area, which is replaced based on background information from a second reference view image.

30. The image processing method of claim 29, further generating a second intermediate center view image for the center viewpoint based on the second reference view image, illustrating the at least one object, from a second reference viewpoint, and based on depth/binocular disparity information of the second reference view image, the image processing method further comprising:
respectively warping at least one foreground of the second reference view image and at least one background of the second reference view image to generate the second intermediate center view image for the center viewpoint, different from the second reference viewpoint, wherein the warping of the at least one foreground and the at least one background of the second reference view image are differently performed based upon a detected error suspicious area of the second reference view image, the detected error suspicious area of the second reference view image being one or more areas of the second reference view image having a determined increased probability of depth disparity error based on the depth/binocular disparity information of the second reference view image, with the warping of the at least one foreground of the second reference view image including regarding the detected error suspicious area of the second reference view image as being respectively included in the at least one foreground;
blending the first intermediate center view image with the second intermediate center view image to generate a center view image from the center viewpoint; and
outputting the center view image as an additional view image that includes the at least one object, from the center viewpoint.

31. An image processing apparatus including one or more processing devices controlled to generate an output view image for an output viewpoint based on a reference view image corresponding to a first reference view for a reference viewpoint, and depth/binocular disparity information of the reference view image, the image processing apparatus comprising:
a foreground-first warping unit, among the one or more of processing devices and controlled to generate a foreground-first image corresponding to the output viewpoint, which is different than the reference viewpoint, by performing a foreground-first warping of a foreground of the reference view image that regards a portion of the reference view image corresponding to a detected error suspicious area as being included in the foreground of the reference view image, with the detected error suspicious area being one or more areas of the reference view image having a determined increased probability of depth disparity error based on the depth/binocular disparity information of the reference view image;
a background-first warping unit, among the one or more of processing devices and controlled to generate a background-first image by performing a background-first warping of a background of the reference view image that excludes the portion of the reference view image corresponding to the error suspicious area; and
a blending unit, among the one or more of processing devices and controlled to blend the foreground-first image and the background-first image to generate the output view image for the output viewpoint,
a discontinuity analyzer, among the one or more of processing devices and controlled to detect a discontinuous portion from the depth/binocular disparity information of the reference view image, the foreground and background being adjacent to the discontinuous portion;
a suspicious area setting unit, among the one or more of processing devices and controlled to set the error suspicious area in the reference view image based on the detected discontinuous portion;
a foreground-first warping information generator, among the one or more of processing devices and controlled to generate foreground-first warping depth/binocular disparity information by expanding depth/binocular disparity information of the foreground to include the error suspicious area to selectively adjust depth/binocular disparity information of the error suspicious area based on the depth/binocular disparity information of the foreground; and
a background-first warping information generator, among the one or more of processing devices and controlled to generate background-first warping depth/binocular disparity information of the background excluding the error suspicious area,
wherein the foreground-first warping unit generates the foreground-first image based on the foreground-first warping depth/binocular disparity information, and the background-first warping unit generates the background-first image based on the background-first warping depth/binocular disparity information, and
wherein the background-first warping information generator regards the discontinuous portion as a hole, excludes the discontinuous portion from the background-first warping, and replaces the hole based on background information from another reference view image.

* * * * *